Patented Mar. 10, 1931

1,795,361

UNITED STATES PATENT OFFICE

OSCAR T. COFFELT, OF GROSSE POINTE PARK, MICHIGAN

PROCESS OF RECOVERING TITANIUM FROM ITS ORES

No Drawing.     Application filed July 5, 1928.  Serial No. 290,707.

The present invention pertains to a process for recovering titanium from its ores and residues, and the object is to procure pure titanium oxide free from iron. The pure product has not yet been obtained on an economical basis, and the usefulness and application of the product may be greatly developed when the cost of production ceases to be prohibitive.

The literature describes the precipitation of titanium from acid solutions by boiling the solutions for a period of time, but the result of this procedure is the formation of titanic acid which upon drying forms a titanium titanate ($TiTiO_3$), a compound which is difficult to free from iron.

The addition of a stabilizing salt, such as sodium chloride, as described in my Patent No. 1,357,690 of November 2, 1920, prevents the formation of titanic acid. In that case the concentration is controlled so that a double salt, such as sodium titanium sulphate, depending on the digesting acid and the stabilizing salt, is formed. The present invention produces titanium free from iron in one step after the addition of the stabilizing agent.

According to the present process, the titanium ores are converted into soluble titanium and iron salts, preferably by grinding and digesting with sulphuric acid of 75 to 90 per cent concentration, substantially in the manner described in my Patent No. 1,357,690. These soluble salts are then dissolved by the addition of a suitable amount of water, and the liquid is freed from suspended and insoluble material by decantation, filtration or otherwise. A reducing agent is preferably added at this stage to reduce all of the ferric sulphate to ferrous sulphate and reduce some of the titanium. For this purpose iron filings or zinc metal may be added, and the excess acid causes evolution of hydrogen. The undissolved reducing metals are removed when a dark violet color, indicating reduced titanium in an acid condition is reached, after having reduced considerable porton of the titanium.

Ammonium chloride is now added to the liquid in the ratio of about one pound for each pound of titanium present. A much smaller amount may be added with satisfactory results, but the above ratio or even a larger amount of ammonium chloride is more likely to insure good results. Water is next added to about twice the volume, and the liquid is then boiled. The dilution is maintained substantially constant by replacing water which evaporates. This dilution is necessary to prevent the formation of titanium double salts such as ammonium titanium sulphate which would occur if the concentration were allowed to increase. The result of the boiling at constant dilution is the formation of a pure titanium compound as a very white precipitate which is readily convertible into oxides by drying. The precipitate in the wet state is believed to consist of $Ti(OH)_3$ or $HTiO_2$ or a mixture of these, the molecular structure being undetermined.

The precipitate is separated from the liquid by filtration or otherwise and is washed with water. It is then dried by heat or may be treated with weak ammonia water to remove small amounts of acid salts which might be present, or fixed by washing the oxides with ammonium hydroxide, barium chloride, or calcium chloride. This treatment converts the precipitate into an oxide or mixture of oxides of titanium, the formula and structure of which are as yet undetermined. Any neutralizing reagent may be used which will not leave an objectionable residue with the titanium or convert the oxides into titanic acids or titanates.

What I claim is:—

1. A process of recovering titanium from its ores containing iron, consisting in digesting the ore with acid and dissolving the soluble salts thus formed, reducing the iron and some of the titanium, adding an ammonium halide and water, boiling and maintaining the dilution until a precipitate containing titanium in combination with oxygen is formed, and removing the precipitate.

2. A process of recovering titanium from its ores containing iron, consisting in digesting the ore with acid and dissolving the soluble salts thus formed, reducing the iron and some of the titanium, adding ammonium chloride and water, boiling and maintaining the dilution until a precipitate containing titanium in combination with oxygen is formed, and removing the precipitate.

3. A process of recovering titanium from its ores containing iron, consisting in digesting the ore with acid and dissolving the soluble salts thus formed, reducing the iron and some of the titanium, adding an ammonium halide in an amount equal to the titanium present, adding water, boiling and maintaining the dilution until a precipitate containing titanium in combination with oxygen is formed, and removing the precipitate.

4. A process of recovering titanium from its ores containing iron, consisting in digesting the ore with acid and dissolving the soluble salts thus formed, reducing the iron and some of the titanium, adding ammonium chloride in an amount equal to the titanium present, adding water, boiling and maintaining the dilution until a precipitate containing titanium in combination with oxygen is formed, and removing the precipitate.

5. A process of recovering titanium from its ores containing iron, consisting in digesting the ore with acid and dissolving the soluble salts thus formed, reducing the iron and some of the titanium, adding an ammonium halide and water to double the volume, boiling and maintaining the dilution until a precipitate containing titanium in combination with oxygen is formed, and removing the precipitate.

6. A process of recovering titanium from its ores containing iron, consisting in digesting the ore with acid and dissolving the soluble salts thus formed, reducing the iron and some of the titanium, adding ammonium chloride and water to double the volume, boiling and maintaining the dilution until a precipitate containing titanium in combination with oxygen is formed, and removing the precipitate.

7. A process of recovering titanium from its ores containing iron, consisting in digesting the ore with acid and dissolving the soluble salts thus formed, reducing the iron and some of the titanium, adding an ammonium halide in an amount equal to the titanium present, adding water to double the volume, boiling and maintaining the dilution until a precipitate containing titanium in combination with oxygen is formed, and removing the precipitate.

8. A process of recovering titanium from its ores containing iron, consisting in digesting the ore with acid and dissolving the soluble salts thus formed, reducing the iron and some of the titanium, adding ammonium chloride in an amount equal to the titanium present, adding water to double the volume, boiling and maintaining the dilution until a precipitate containing titanium in combination with oxygen is formed, and removing the precipitate.

9. A process of recovering titanium from its ores containing iron consisting in digesting the ore with acid and dissolving the soluble salts thus formed, removing the solution from the insoluble residue, reducing the iron and some of the titanium, adding an ammonium halide and water, boiling and maintaining the dilution until a precipitate containing titanium in combination with oxygen is formed, and removing the precipitate.

10. A process of recovering titanium from its ores containing iron, consisting in digesting the ore with acid and dissolving the soluble salts thus formed, removing the solution from the insoluble residue, reducing the iron and some of the titanium, adding ammonium chloride in an amount equal to the titanium present, adding water to double the volume, boiling and maintaining the dilution until a precipitate containing titanium in combination with oxygen is formed, and removing the precipitate.

In testimony whereof I affix my signature.

OSCAR T. COFFELT.